United States Patent
Wei et al.

(10) Patent No.: US 10,342,001 B2
(45) Date of Patent: Jul. 2, 2019

(54) BASE STATION AND USER EQUIPMENT HAVING ON-DEMAND SIGNALLING MECHANISM IN DIRECTIONAL WIRELESS COMMUNICATION SYSTEM

(71) Applicants: National Taiwan University, Taipei (TW); MediaTek Inc., Hsinchu (TW)

(72) Inventors: Hung-Yu Wei, Taipei (TW); Ching-Chun Chou, Taipei (TW)

(73) Assignees: National Taiwan University, Taipei (TW); MediaTek Inc., Hsinchu (TW)

( * ) Notice: Subject to any disclaimer, the term of this patent is extended or adjusted under 35 U.S.C. 154(b) by 43 days.

(21) Appl. No.: 15/499,816

(22) Filed: Apr. 27, 2017

(65) Prior Publication Data
US 2017/0339678 A1 Nov. 23, 2017

Related U.S. Application Data

(60) Provisional application No. 62/339,236, filed on May 20, 2016.

(51) Int. Cl.
  *H04W 72/04* (2009.01)
  *H04W 16/28* (2009.01)
  *H04W 72/12* (2009.01)

(52) U.S. Cl.
  CPC ......... *H04W 72/042* (2013.01); *H04W 16/28* (2013.01); *H04W 72/0413* (2013.01);
  (Continued)

(58) Field of Classification Search
  CPC .............. H04W 72/042; H04W 16/28; H04W 72/0406; H04W 72/048; H04W 72/1278; H04W 72/0413
  (Continued)

(56) References Cited

U.S. PATENT DOCUMENTS

| 2014/0314001 A1* | 10/2014 | Sambhwani | H04W 72/04 370/329 |
| 2014/0342748 A1* | 11/2014 | Zou | H04W 72/0426 455/452.1 |

(Continued)

FOREIGN PATENT DOCUMENTS

| EP | 2988544 | 2/2016 |
| WO | 2013137794 | 9/2013 |

OTHER PUBLICATIONS

"Office Action of Taiwan Counterpart Application", dated Nov. 28, 2018, p. 1-p. 15.

*Primary Examiner* — Rownak Islam
(74) *Attorney, Agent, or Firm* — JCIPRNET (57) ABSTRACT

The disclosure is directed to a base station and a user equipment having on-demand signaling mechanism in directional wireless system. According to one of the exemplary embodiment, the present disclosure proposes a base station which includes at least but not limited to a transmitter and a receiver to transmit and receive data respectively and a processing circuit coupled to the transmitter and the receiver and is configured at least to receive through the receiver a service request to start an on-demand transmission, configure a control signaling to schedule a schedulable resource based on the service request in response to starting the on-demand transmission, and transmit through the transmitter the control signaling for triggering reference signals of an external base station to transmit the scheduled schedulable resource, wherein the reference signals are aperiodic and directional.

11 Claims, 6 Drawing Sheets

(52) U.S. Cl.
CPC .... *H04W 72/1278* (2013.01); *H04W 72/0406* (2013.01); *H04W 72/048* (2013.01)

(58) Field of Classification Search
USPC ........................................................ 370/329
See application file for complete search history.

(56) References Cited

U.S. PATENT DOCUMENTS

| | | |
|---|---|---|
| 2015/0230263 A1 | 8/2015 | Roy et al. |
| 2016/0043843 A1 | 2/2016 | Liu et al. |
| 2016/0050004 A1* | 2/2016 | Mallik ................. H04B 7/0626 370/329 |
| 2016/0105817 A1 | 4/2016 | Frenne et al. |
| 2016/0234736 A1* | 8/2016 | Kubota ............. H04W 36/0083 |
| 2016/0345203 A1* | 11/2016 | Lim ..................... H04W 28/08 |
| 2017/0086199 A1* | 3/2017 | Zhang ................. H04W 24/02 |
| 2017/0222693 A1* | 8/2017 | Shen ................... H04B 7/0408 |

* cited by examiner

BASE STATION AND USER EQUIPMENT HAVING ON-DEMAND SIGNALLING MECHANISM IN DIRECTIONAL WIRELESS COMMUNICATION SYSTEM

CROSS REFERENCE TO RELATED APPLICATION

This application claims the priority benefit of U.S. provisional application Ser. No. 62/339,236 filed on May 20, 2016. The entirety of the above-mentioned patent application is hereby incorporated by reference herein and made a part of specification.

TECHNICAL FIELD

The present invention generally relates to a base station and a user equipment having on-demand signalling mechanism in a directional wireless communication system.

BACKGROUND

In order to meet the increasing demand for wireless communication services, efforts have been made to develop improved or pre-5G or 5G communication system.

In a foreseeable future 5G wireless communication network, better services could be provided by deploying a large number of small cells below the existing macro cell to improve cellular network capacity. Further, carrier aggregation (CA) could also be an effective way to increase the data rates. When carrier aggregation is utilized by a wireless communication system, each component carrier could be considered to serve an individual cell. Each cell may have a different coverage range or may overlap with another cell partially or completely. When carriers are aggregated, each carrier is referred to as a component carrier. For general macro-assisted architecture, the primary component carrier (PCC) would serve the primary serving cell Pcell (i.e., macro cell) and could provide most or all of the signalling transmissions for both uplinks and downlinks. While the secondary component carrier (SCC) would serve a secondary serving cell Scell (i.e., small cell) for downlinks and possibly uplinks and would mostly be used carry user data.

On the other hand, the Millimeter Wave (mmWave) communication is an emerging technology endowed with large spectrum resources as the technology operates on one or more frequency bands between 30 GHz and 300 GHz. Because of the high path loss associated with the mmWave communication, usually highly directional antenna having a large aperture. However, wireless communications using directional antennas would require transmissions in appropriate directions. In such scenario, the direction or position in the angular domain of each of the UEs relative to the base station would need to be known in order to allocate resources for the UEs. To obtain the direction of UEs and conditions of channels, a base station conventionally rely upon transmitting reference signals in exchange for channel condition information received from UEs.

When combining mmWave communication with carrier aggregation architecture, beam configuration should be appropriately configured for a dual-connecting UE in order to provide control signaling and data transmission for directional mmWave communications. However, since reference signals are generally periodic transmitted, how to effectively transmit control signaling and then data transmission in a beam direction in a non-periodic way has been an important goal to be achieved by the persons skilled in the field.

SUMMARY OF THE INVENTION

Accordingly, the present invention is directed to a base station and a user equipment having on-demand signaling mechanism in directional wireless system.

According to one of the exemplary embodiments, the disclosure is directed to a base station which includes at least but not limited to a transmitter and a receiver to transmit and receive data respectively and a processing circuit coupled to the transmitter and the receiver and is configured at least to receive through the receiver a service request to start an on-demand transmission, configure a control signaling to schedule a schedulable resource based on the service request in response to starting the on-demand transmission, and transmit through the transmitter the control signaling for triggering reference signals of an external base station to transmit the scheduled schedulable resource, wherein the reference signals are aperiodic and directional.

According to one of the exemplary embodiments, the disclosure is directed to a base station which includes at least but not limited to a transmitter and a receiver to transmit and receive data respectively and a processing circuit coupled to the transmitter and the receiver and is configured at least to transmit through the transmitter a service configuration to start an on-demand transmission, configure a control signaling to schedule a schedulable resource based on the service configuration in response to starting the on-demand transmission, and transmit through the transmitter the control signaling for triggering reference signals of an external base station to transmit the scheduled schedulable resource, wherein the reference signals are aperiodic and directional.

According to one of the exemplary embodiments, the disclosure is directed to a user equipment (UE) which includes at least but not limited to a transmitter and a receiver to transmit and receive data respectively and a processing circuit coupled to the transmitter and the receiver and is configured at least to transmit through the transmitter a service request to start an on-demand transmission, wherein the service request indicates the UE needs to be served, receive through the receiver reference signals in response to a small cell base station is aligned with the UE after starting the on-demand transmission, wherein the reference signals are aperiodic and directional, transmit through the transmitter a feedback signal in response to receiving the reference signals, and receive through the receiver a configuration for data transmission between the small cell base station and the UE after transmitting the feedback signal.

According to one of the exemplary embodiments, the disclosure is directed to a user equipment (UE) which includes at least but not limited to a transmitter and a receiver to transmit and receive data respectively and a processing circuit coupled to the transmitter and the receiver and is configured at least to receive through a service configuration to start an on-demand transmission, wherein the service configuration indicates the UE to be scheduled for service, receive through receiver reference signals in response to a small cell base station is aligned with the UE after starting the on-demand transmission, wherein the reference signals are aperiodic and directional, transmit through a feedback signal in response to receiving the reference signals, and receive through the receiver a configuration for data transmission between the small cell base station and the UE after transmitting the feedback signal.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The disclosure provides a mechanism for UE control signaling and data scheduling in an mmWave communication system. The transmission of reference signals and user data could be on-demand based on user demand or based on network policy. The transmission of the reference signals is assumed to be directional. According exemplary embodiments of the disclosure, the service request and the subsequent scheduling would be on-demand so as to improve the power saving of related communication devices.

The control signaling and data transmission for directional mmWave communications could be macro cell assisted (e.g. coordinated by PCell or MeNB). The macro cell base station may choose to transmit control signaling (such as reference signaling, configuration signaling) and then user data in a particular beam direction in a non-periodic way. For example, the base station may start an on-demand transmission procedure such as by transmitting reference signals or exchanging control messages exchange in a particular beam direction. The base station may buffer downlink packets to UEs in this beam direction according to one or more communication need as indicated by the UE. Alternatively, the service request may also be UE-initiated. An UE may initiated the service request by paging the Pcell. The reference signals would only be transmitted in areas in which UE(s) sends the service quest. In this way, the data transmission would be on-demand.

To realize the above described concepts, the following disclosure provides various exemplary embodiments to elucidate such concepts with further details. In these following exemplary embodiments, a dual connectivity architecture is assumed.

Figure 1:
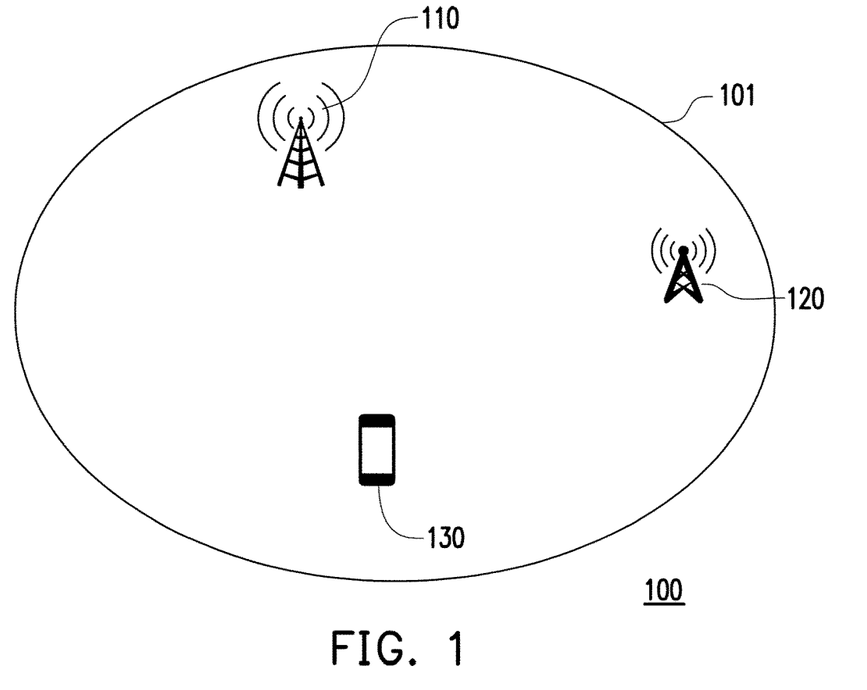
FIG. 1 is a schematic diagram illustrating a dual connectivity wireless communication system in accordance with one of the exemplary embodiments.

FIG. 1 is a schematic diagram illustrating a dual connectivity wireless communication system in accordance with one of the exemplary embodiments.

Referring to FIG. 1, a dual connectivity wireless communication system 100 would include not limited to a macro cell base station 110 (i.e. eNB), a small cell base station 120 such as a Micro cell eNB, a Pico cell eNB, or a Femto cell eNB and a UE 130. Nonetheless, it should be understood that, the example of FIG. 1 is merely exemplary instead of limitations to the invention. That is, the coverage 101 within the macro cell base station 110 may include not limited to one or more small cell base stations or one or more UEs.

In such scenario, the dual connectivity wireless communication system 100 is a macro-assisted wireless architecture, i.e., the macro cell base station 110 may provide signaling transmissions to the UE 130 while the small cell base station 120 provides data transmissions. In one of the exemplary embodiments, the macro-assisted wireless architecture could be the 3GPP dual connectivity architecture. For example, the macro cell base station 110 might be lower band (e.g. smaller than 6 GHz) cellular coverage, and the small cell base station 120 might be mmWave communications.

For the purpose to provide control signaling (e.g. reference signaling, configuration signaling) and data transmission for directional mmWave communications, and to transmit control signaling and then data transmission in a beam direction in a non-periodic way, an on-demand transmission procedure is proposed based on the dual connectivity wireless communication system 100.

FIG. 2A-2E are schematic diagrams illustrating an on-demand transmission procedure initiated by the UE 130 in accordance with one of the exemplary embodiments.

Figure 2A:
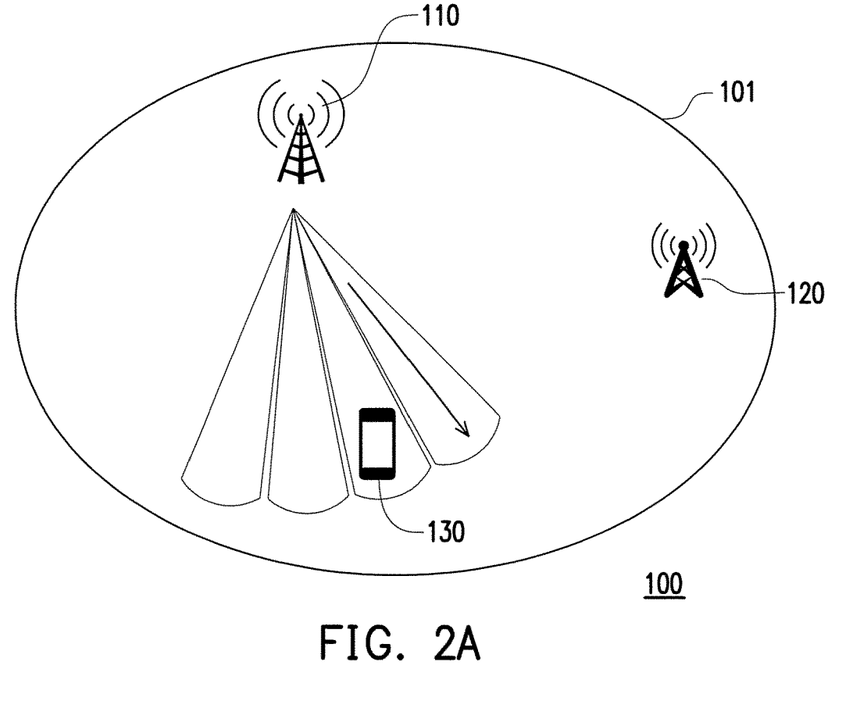
FIG. 2A-2E are schematic diagrams illustrating an on-demand transmission procedure initiated by the UE 130 in accordance with one of the exemplary embodiments.

First, referring to FIG. 2A, the macro cell base station 110 may provide an uplink resource for service request. The macro cell base station 110 may either provide uplink resource through directional beams of different angles or perform an omni-directional transmission for the uplink resource. The uplink resource is being used to transmit a service request if the UE 130 needs to be served. The macro cell base station 110 may use broadcast signaling message to transmit the uplink resource. In one example, the macro cell base station 110 may transmit the uplink resource in system information block (SIB), and the SIB might be transmitted periodically in macro cell. In another example, the macro cell base station 110 may transmit a paging message to notify the UE 130 the uplink resource for the service request. It is noted that the uplink resource may be provided in many different forms and should not be construed as being limited to the embodiments set forth herein.

Figure 2B:
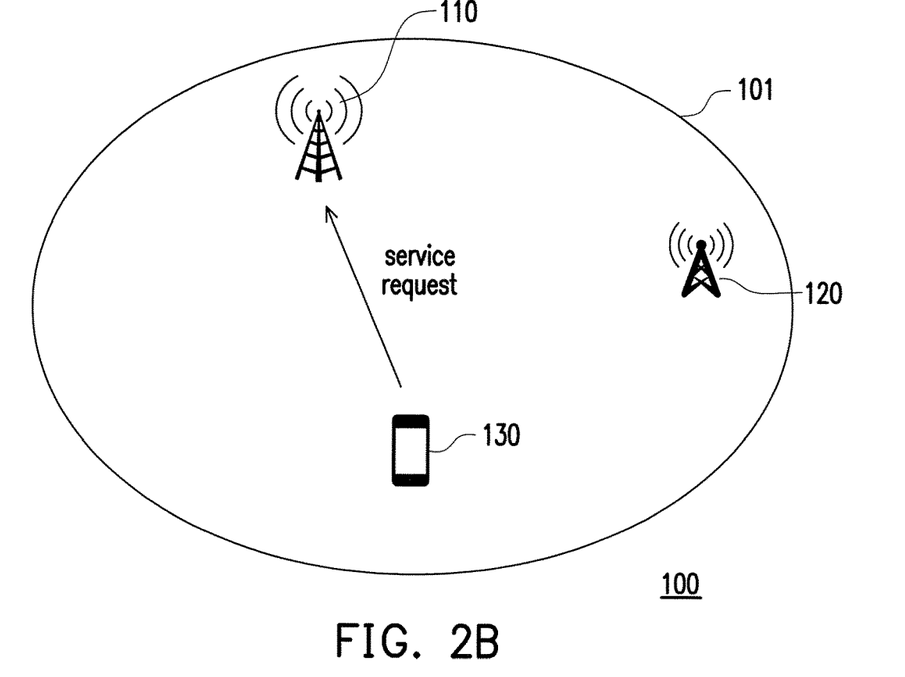

Referring to FIG. 2B, when the UE 130 needs to be served, it may transmit a service request to start an on-demand transmission procedure. The service request is not only to show the will of connection establishment and transmission of the UE 130, but also to indicate a communication need of the UE 130. The service request is transmitted to the macro cell base station 110 by using the uplink resource that the macro cell base station 110 provided. It can be view as an initialization procedure for the following reference signal and downlink transmission.

Then, the macro cell base station 110 may configure a control signaling to schedule a schedulable resource based on the service request in response to starting the on-demand transmission. In this stage, the macro cell base station 110 may collect information for the control signaling. The information may comprise location, traffic patterns and UE specific information of the UE 130, where the UE specific information further comprises preferences, grouping and priority. Further, the information may be obtained based on history or collected information of the UE. In addition, the control signaling may comprise beam configuration, such as beam directions, timing, power, etc., and reference signal configuration for the UE 130. For example, the reference signal configuration may comprise: only transmit reference signals to areas with UEs need to be served, only small cell base stations with UEs need to be served should be transmitting reference signal configuration, or whether to group or prioritize UEs to enhance reference signal transmission, but the disclosure is not limited thereto.

Figure 2C:
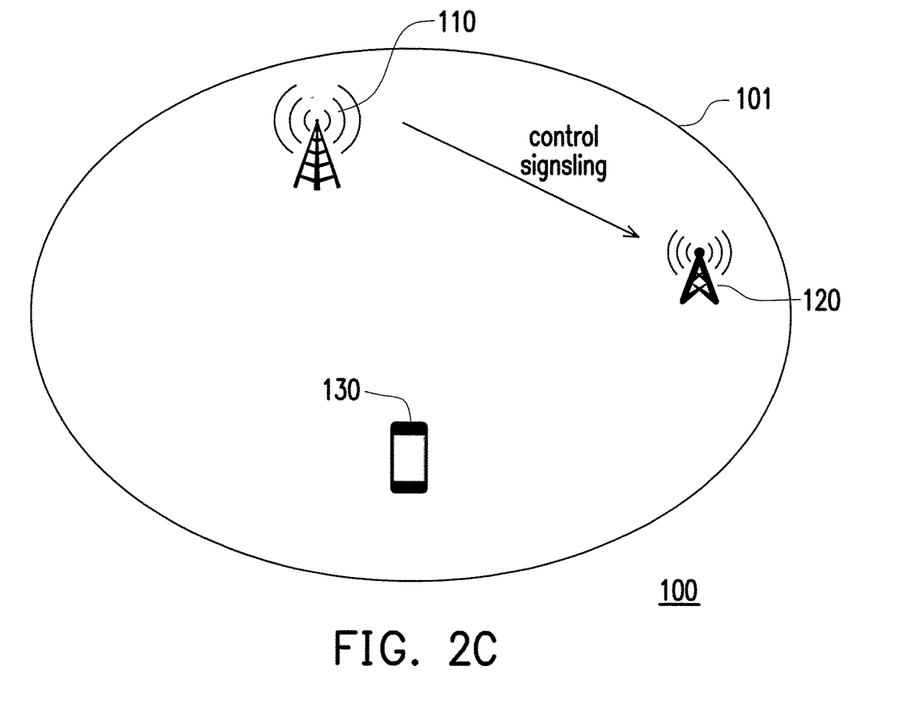

Referring to FIG. 2C, the macro cell base station 110 may transmit the control signaling for triggering reference signals of the small cell base station 120 to transmit the scheduled schedulable resource. Since the control signaling, which is configured based on the service request, comprises information of beam configuration and reference signal configuration, it specifically indicates the reference signals should be transmitted from the small cell base station 120 to the UE 130. Hence, the reference signals are aperiodic and directional.

Figure 2D:
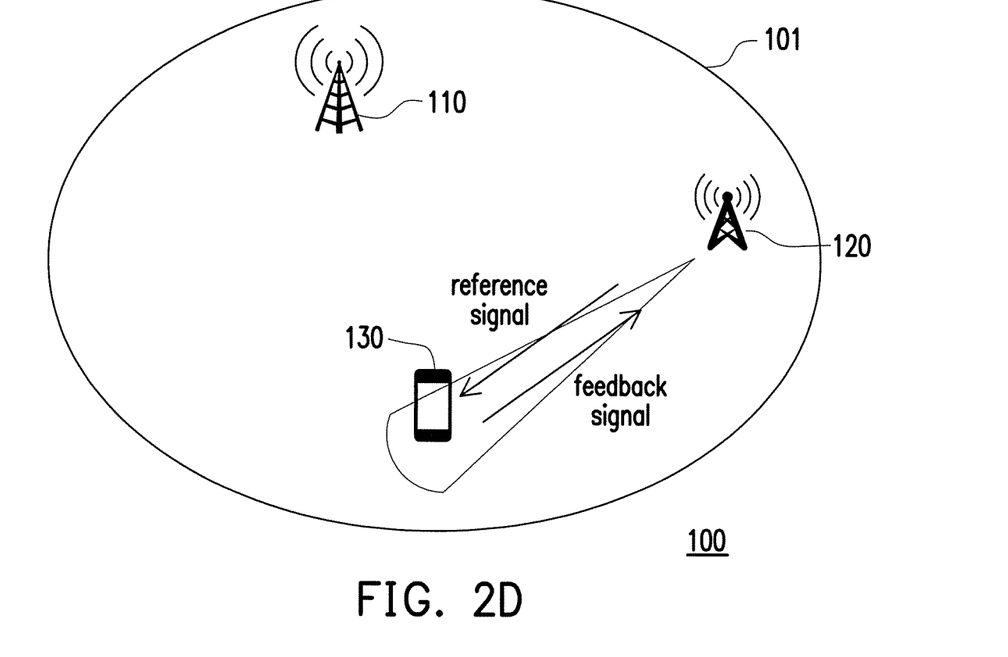

Referring to FIG. 2D, if the small cell base station 120 is aligned with the UE 130, the reference signals should be transmitted directly. Hence, the UE would receive the reference signals from the small cell base station 120. However, if the small cell base station 120 is not aligned with the UE 130 (not shown), the small cell base station 120 should search for other beam configuration of possible directions, i.e., the correct beam configuration. After the reference signals have been received by the UE 130, it would perform a channel state information (CSI) measurement based on the reference signals and subsequently transmit a feedback signal comprising the measurement result back to the small cell base station 120.

Figure 2E:
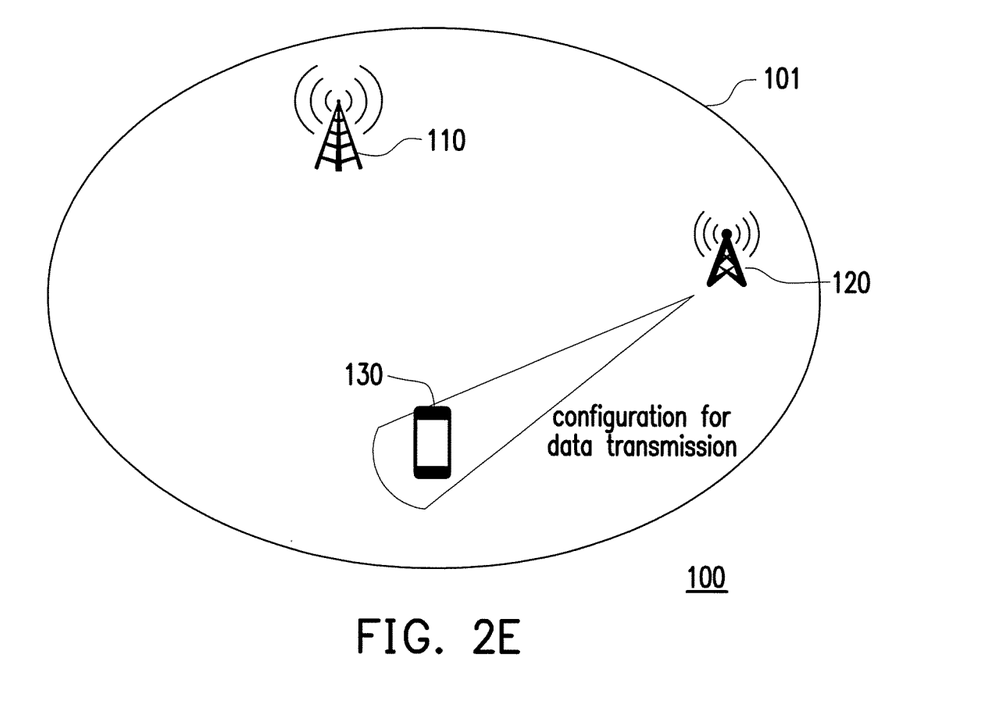

Finally, referring to FIG. 2E, the UE 130 may receive a configuration for beam-forming data transmission between the small cell base station 120 and the UE 130 from the small cell base station 120. The configuration is configured based on the feedback signal and gathered information of the UE 130 by the small cell base station 120, where the gathered information of the UE comprises CSI measurement and beam configuration. Further, the configuration may be prioritized based on UEs' preference, system load or other metrics, freshness of the CSI info and Quality of Service (QoS) requirements of traffic. It is noted that the gathered information further serves as historical information in the small cell base station 120 or the macro cell base station 110. As a result, the beam-forming data transmission between the small cell base station 120 and the UE 130 is based on the UE 130's demand.

Figure 3:
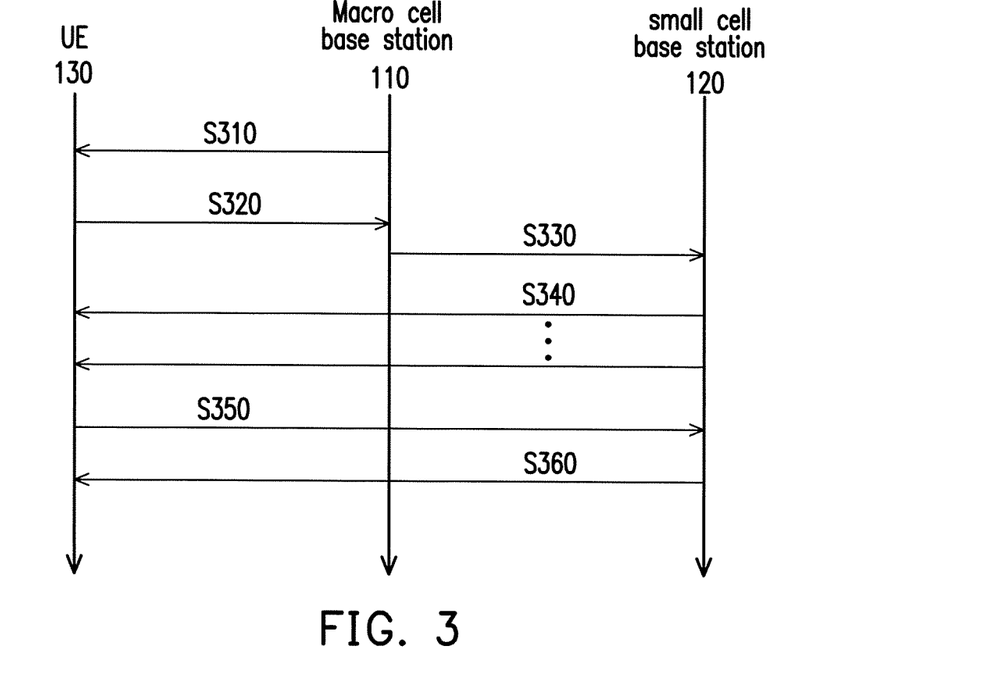
FIG. 3 illustrates a signaling flow of an on-demand transmission procedure initiated by the UE in accordance with one of the exemplary embodiments.

In brief, FIG. 3 illustrates a signaling flow of an on-demand transmission procedure initiated by the UE in accordance with one of the exemplary embodiments. In step S310, the macro cell base station 110 provides an uplink resource for a service request to the UE 130. In step S320, the UE 130 transmit a service request to the macro cell base station 110. The service request indicates the UE 130 needs to be served. In step S330, the macro cell base station 110 transmit a control signaling to the small cell base station 120 for triggering reference signals of the small cell base station 120 to transmit the scheduled schedulable resource. In step S340, the small cell base station 120 transmits reference signals to the UE 130. In step S350, the UE 130 transmits a feedback signal to the small cell base station 120. Finally, in step S360, the small cell base station 120 transmits a configuration for data transmission between the small cell base station 120 and the UE 130.

Figure 4:
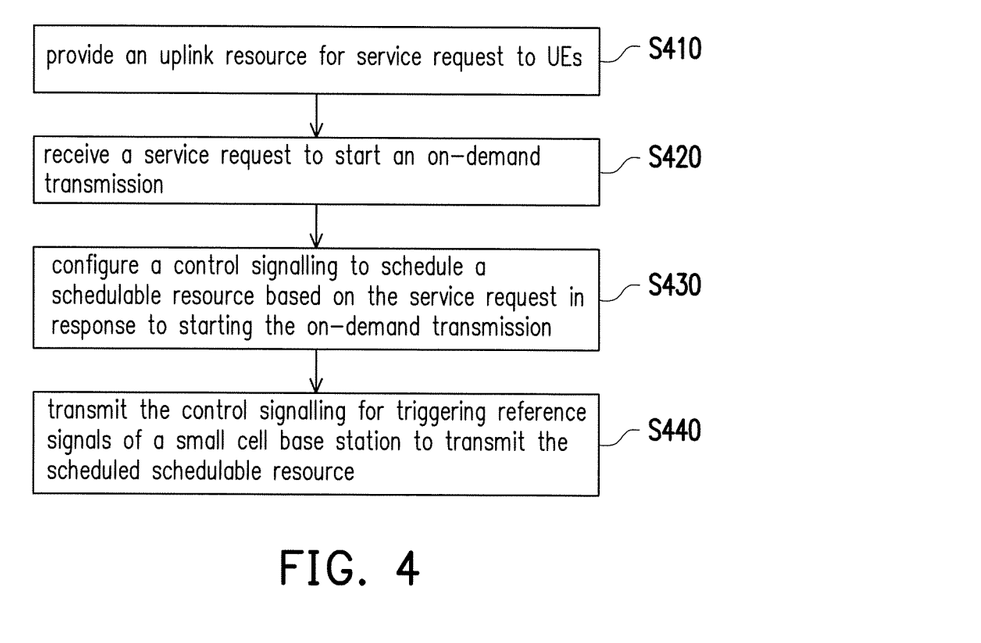
FIG. 4 illustrates a summary of the proposed an on-demand transmission mechanism initiated by UE in directional wireless system from the perspective of a macro base station in accordance with one of the exemplary embodiments of the disclosure.

FIG. 4 illustrates a summary of the proposed an on-demand transmission mechanism initiated by UE in directional wireless system from the perspective of a macro base station in accordance with one of the exemplary embodiments of the disclosure. In step S410, a macro cell base station provides an uplink resource for service request to UEs. In step S420, the macro cell base station receives a service request to start an on-demand transmission. In step S430, the macro cell base station configures a control signaling to schedule a schedulable resource based on the service request in response to starting the on-demand transmission. In step S440, the macro cell base station transmits the control signaling for triggering reference signals of a small cell base station to transmit the scheduled schedulable resource, wherein the reference signals are aperiodic and directional.

Figure 5:
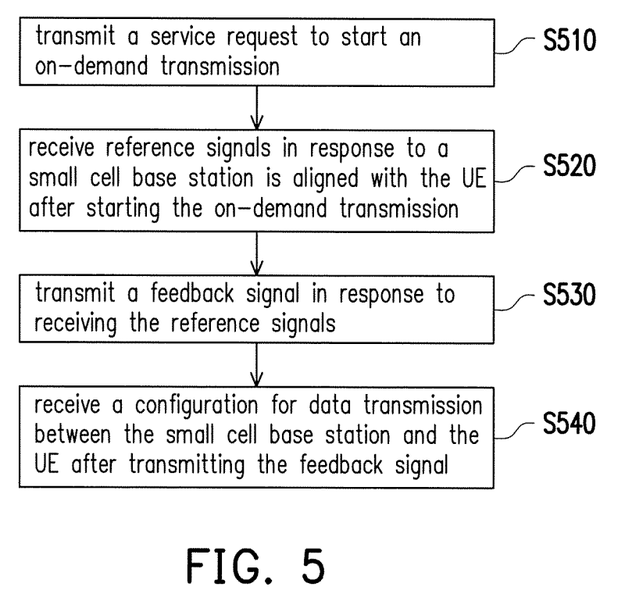
FIG. 5 illustrates a summary of the proposed an on-demand transmission mechanism initiated by UE in directional wireless system from the perspective of a UE in accordance with one of the exemplary embodiments of the disclosure.

FIG. 5 illustrates a summary of the proposed an on-demand transmission mechanism initiated by UE in directional wireless system from the perspective of a UE in accordance with one of the exemplary embodiments of the disclosure. In step S510, a UE transmit a service request to start an on-demand transmission, wherein the service request indicates the UE needs to be served. If a small cell base station is aligned with the UE, then in step S520, the UE receives reference signals after starting the on-demand transmission, wherein the reference signals are aperiodic and directional. In step S530, the UE transmits a feedback signal in response to receiving the reference signals. In step S540, the UE receives a configuration for data transmission between the small cell base station and the UE after transmitting the feedback signal. Then, the UE performs data transmission between the small cell base station and the UE based on the configuration accordingly. It is noted that the data transmission comprises downlink data transmission or uplink data transmission. However, if the small cell base station is not aligned with the UE, the UE would not receive reference signals after the Step S510 since the small cell base station still search for other beam configuration of possible directions.

Moreover, it is worth mentioning that, the invention is not intended to limit activated an on-demand transmission procedure by UE. In another embodiment of the invention, the macro cell base station 110 may also initiate the scheduling actively without UE 130's service request.

Specifically, the macro cell base station 110 may transmit a service configuration to the UE 130 to start an on-demand transmission. The service configuration directly indicates the UE 130 to be scheduled for service without the UE 130's service request. The service configuration is by paging or other active configuration, which is not limited by the invention. After the macro cell base station 110 transmitted the service configuration to the UE 130, reference may be made to the FIG. 2C-2E for details of the remaining procedure of the on-demand transmission procedure, and will not be repeated here.

Figure 6:
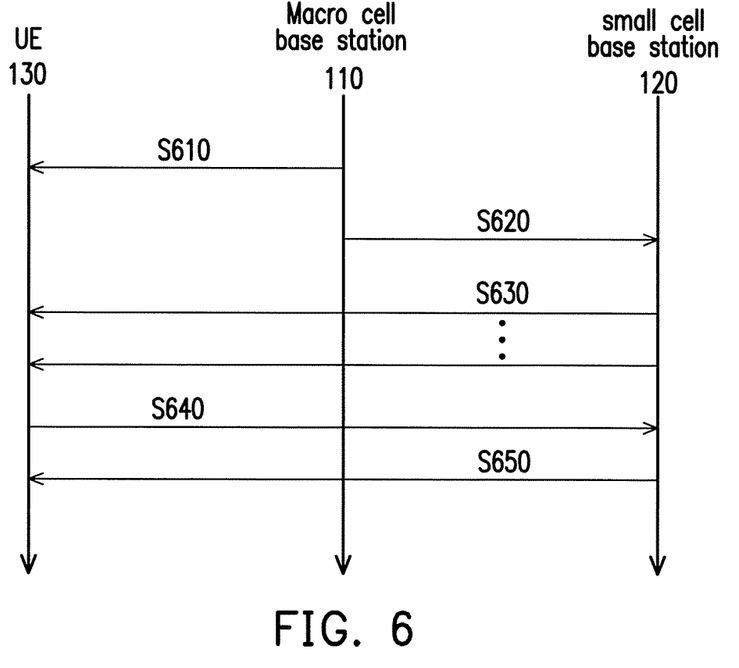
FIG. 6 illustrates a signaling flow of an on-demand transmission procedure initiated by the network (or the macro base station) in accordance with one of the exemplary embodiments.

In brief, FIG. 6 illustrates a signaling flow of an on-demand transmission procedure initiated by the network (or the macro base station) in accordance with one of the exemplary embodiments. Referring to FIG. 6, the steps (i.e., step S610-S650) in FIG. 6 are similar to those of FIG. 3 and the major difference between the two is that, the step S310 and S320 are replaced by S610 that the macro cell base station 110 directly transmits a service configuration to the UE 130 to start an on-demand transmission without the UE 130's service request.

Figure 7:
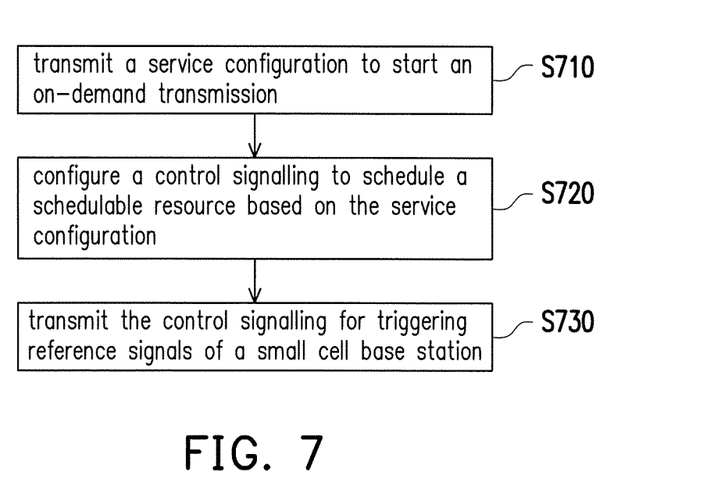
FIG. 7 illustrates a summary of the proposed an on-demand transmission mechanism initiated by network in directional wireless system from the perspective of a macro base station in accordance with one of the exemplary embodiments of the disclosure.

FIG. 7 illustrates a summary of the proposed an on-demand transmission mechanism initiated by network in directional wireless system from the perspective of a macro base station in accordance with one of the exemplary embodiments of the disclosure. Similarly, the steps (i.e., step S710-S730) in FIG. 7 are similar to those of FIG. 4 and the major difference between the two is that, the step S410 and S420 are replaced by S710 that a macro cell base station directly transmits a service configuration to start an on-demand transmission. Besides, in step S720, the macro cell base station configures a control signaling to schedule the schedulable resource based on the service configuration rather than the service request.

According to one of the exemplary embodiments, the processing circuit is further configured to provide an uplink resource for the service request.

According to one of the exemplary embodiments, the service request indicates a UE need to be served.

According to one of the exemplary embodiments, the reference signal is transmitted from the external base station to the UE in response to the UE is aligned with the external base station.

According to one of the exemplary embodiments, the processing circuit is further configured to collect information for the control signaling, wherein the information is obtained based on history or collected information of the UE.

According to one of the exemplary embodiments, the information comprises location, traffic patterns and UE specific information, and the UE specific information comprises preferences, grouping and priority.

According to one of the exemplary embodiments, the service configuration indicates a UE to be scheduled for service.

Figure 8:
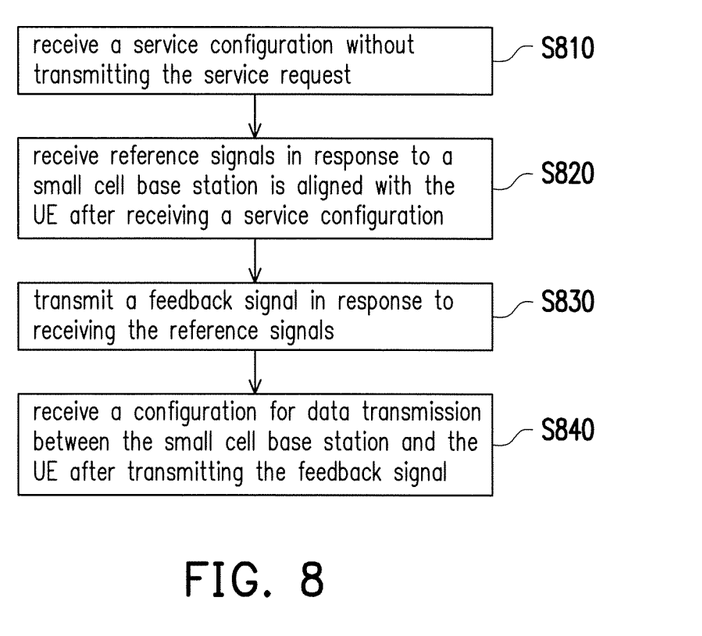
FIG. 8 illustrates a summary of the proposed an on-demand transmission mechanism initiated by network in directional wireless system from the perspective of a UE in accordance with one of the exemplary embodiments of the disclosure.

FIG. 8 illustrates a summary of the proposed an on-demand transmission mechanism initiated by network in directional wireless system from the perspective of a UE in accordance with one of the exemplary embodiments of the disclosure. Similarly, the steps (i.e., step S810-S840) in FIG. 8 are similar to those of FIG. 5 and the major difference between the two is that, the step S710 is replaced by S810 that a UE receives a service configuration without transmitting the service request, wherein the service configuration indicates the UE to be scheduled for service.

In view of the aforementioned descriptions, the present disclosure is suitable for being used in directional wireless communication system that uses mm-Wave technology and is able to having on-demand signaling mechanism in a dual or multi-connectivity communication system. In this way, UEs in beam directions which do not have active on-demand transmission might enter energy saving mode and thus to provide energy efficiency improvement.

According to one of the exemplary embodiments, the UE transmits the service request to a macro base station, and the UE receives the reference signals from the small cell base station.

According to one of the exemplary embodiments, the processing circuit is further configured to receive through the receiver a service configuration without transmitting the service request, wherein the service configuration indicates the UE to be scheduled for service.

According to one of the exemplary embodiments, the UE receives the service configuration from a macro base station, and the UE receives the reference signals from the small cell base station.

According to one of the exemplary embodiments, the small cell base station searches for other beam configuration of possible directions in response to the small cell base station is not aligned with the UE.

According to one of the exemplary embodiments, the configuration is configured based on the feedback signal and gathered information of the UE by the small cell base station, wherein the gathered information of the UE comprises CSI measurement and beam configuration.

According to one of the exemplary embodiments, the gathered information further serves as historical information.

According to one of the exemplary embodiments, the configuration is prioritized based on UEs' preference, system load or other metrics, freshness of the CSI info and QoS requirements of traffic.

According to one of the exemplary embodiments, the data transmission between the small cell base station and the UE are mmWave communication link.

In this disclosure, 3GPP-like keywords or phrases are used merely as examples to present inventive concepts in accordance with the present disclosure. However, the same concept presented in the disclosure can be applied to any other systems such as IEEE 802.11, IEEE 802.16, WiMAX, and so like by persons of ordinarily skilled in the art. For exemplary purposes, a 3GPP dual connectivity architecture would be used as examples for the rest of the disclosure.

The term "eNodeB" (eNB) in this disclosure may also be, for example, a base station (BS), a macro BS, a micro BS, a pico BS, a Node-B, an advanced base station (ABS), a base transceiver system (BTS), an access point, a home base station, a home eNB, a relay station, a scatterer, a repeater, an intermediate node, an intermediary, satellite-based communication base stations, and so forth.

Each eNB of a 3GPP dual connectivity architecture may contain at least but not limited to a transceiver circuit, an analog-to-digital (A/D)/digital-to-analog (D/A) converter, a processing circuit, a memory circuit, and one or more antenna units. The transceiver circuit may include one or more transceivers of the same or different frequencies such as mmWave frequencies or radio frequencies and transmits downlink signals and receives uplink signals wirelessly. The transceiver circuit may also perform operations such as low noise amplifying, impedance matching, frequency mixing, up or down frequency conversion, filtering, amplifying, and so like. The analog-to-digital (A/D)/digital-to-analog (D/A) converter is configured to convert from an analog signal format to a digital signal format during uplink signal processing and from a digital signal format to an analog signal format during downlink signal processing.

The processing circuit may include one or more processors would be configured to process digital signal and to perform functions of the proposed base station in accordance with exemplary embodiments of the present disclosure. Also, the processing circuit would be coupled to a memory circuit which stores programming codes, codebook configurations, buffered data, or record configurations assigned by the processing circuit. The functions of the above described one or more processors may be implemented using programmable units such as a micro-processor, a micro-controller, a DSP chips, FPGA, etc. The functions of the processing circuit could be integrated under one electronic device or one integrated circuit (IC) but may also be implemented with separate electronic devices or ICs.

The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a mobile environment, such as a bus, a train, an airplane, a boat, a car, and so forth.

Each UE of the communication system may contain at least but not limited to a transceiver circuit, an analog-to-digital (A/D)/digital-to-analog (D/A) converter, a processing circuit, a memory circuit, and one or more antenna units. The transceiver circuit may include one or more transceivers of the same or different frequencies such as mmWave frequencies or radio frequencies and transmits downlink signals and receives uplink signals wirelessly. The transceiver circuit may also perform operations such as low noise amplifying, impedance matching, frequency mixing, up or down frequency conversion, filtering, amplifying, and so like. The memory circuit may store programming codes, buffer data, and a configured codebook. The processing circuit may include one or more processors and may further include a precoding unit. The function of each element of a UE is similar to an eNB and therefore detailed descriptions for each element will not be repeated.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A base stations, comprising:
   a transmitter;
   a receiver; and
   a processing circuit coupled to the transmitter and the receiver and is configured at least to:
   transmit, via the transmitter, a service configuration to start an on-demand transmission;
   configure a control signaling to schedule a schedulable resource based or the service configuration in response to starting the on-demand transmission; and
   transmit, via the transmitter, the control signaling to an external base station for triggering reference signals of the external base station to transmit the scheduled schedulable resource, wherein the reference signals are aperiodic and directional:
   wherein the service configuration indicates a user equipment (UE) to be scheduled for service,
   wherein the control signaling comprises beam configuration and reference signal configuration for the UE,
   wherein the reference signals are produced by the external base station according to the control signaling.

2. The base station according to claim 1, wherein the reference signal is transmitted from the external base station to the UE in response to the UE is aligned with the external base station.

3. The base station according to claim 2, wherein the processing circuit is further configured to:
   collect information for the control signaling, wherein the information is based on history or collected information of the UE.

4. The base station according to claim 3, wherein the information comprises location, traffic patterns and UE specific information, and the UE specific information comprises preferences, grouping and priority.

5. A user equipment (UE), comprising:
   a transmitter;
   a receiver; and
   a processing circuit coupled to the transmitter and the receiver and is configured at least to:
   receive, via the receiver, a service configuration to start an on-demand transmission, wherein the service configuration indicates the UE to be scheduled for service;
   receive, via the receiver, reference signals in response to a small cell base station is aligned with the UE after starting the on-demand transmission, wherein the reference signals are aperiodic and directional, wherein the reference signals are produced by the small cell base station according to a control signaling, wherein the control signaling in the small cell base station is for triggering the reference signals, wherein the control signaling comprises beam configuration and reference signal configuration for the UE;
   transmit, via the transmitter, a feedback signal in response to receiving the reference signals; and
   receive, via the receiver, a configuration for data transmission between the small cell base station and the UE after transmitting the feedback signal.

6. The UE according to claim 5, wherein the UE receives the service configuration from a macro base station, and the UE receives the reference signals from the small cell base station.

7. The UE according to claim 5, wherein the small cell base station searches for other beam configuration of possible directions in response to the small cell base station is not aligned with the UE.

8. The UE according to claim 5, wherein the configuration is configured based on the feedback signal and gathered information of the UE by the small cell base station, wherein the gathered information of the UE comprises channel state information (CSI) measurement and the beam configuration.

9. The UE according to claim 8, wherein the gathered information further serves as historical information.

10. The UE according to claim 5, wherein the configuration is prioritized based on UEs' preference, system load or other metrics, freshness of channel state information (CSI) info and Quality of Service (QoS) requirements of traffic.

11. The UE according to claim 5, wherein the data transmission between the small cell base station and the UE are Millimeter Wave (mmWave) communication link.

* * * * *